(12) United States Patent
Yoshida et al.

(10) Patent No.: US 11,275,323 B2
(45) Date of Patent: Mar. 15, 2022

(54) OPTICAL SCANNING DEVICE AND IMAGE FORMING DEVICE

(71) Applicant: KYOCERA Document Solutions Inc., Osaka (JP)

(72) Inventors: Shingo Yoshida, Osaka (JP); Tatsuya Kobayashi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/341,722

(22) Filed: Jun. 8, 2021

(65) Prior Publication Data

US 2021/0382408 A1 Dec. 9, 2021

(30) Foreign Application Priority Data

Jun. 9, 2020 (JP) .............................. JP2020-100270

(51) Int. Cl.
*G03G 15/043* (2006.01)
*G02B 27/00* (2006.01)
*G03G 21/00* (2006.01)

(52) U.S. Cl.
CPC ....... *G03G 15/043* (2013.01); *G02B 27/0006* (2013.01); *G03G 21/00* (2013.01)

(58) Field of Classification Search
CPC ... G03G 15/043; G03G 21/00; G02B 27/0006
See application file for complete search history.

(56) References Cited

U.S. PATENT DOCUMENTS

2009/0148173 A1* 6/2009 Tajima .................. G03G 21/00
399/36
2014/0112676 A1* 4/2014 Mori ..................... G03G 15/55
399/49

FOREIGN PATENT DOCUMENTS

JP        2004-333799        11/2004
JP        2012-042588        3/2012

* cited by examiner

*Primary Examiner* — Gregory H Curran
(74) *Attorney, Agent, or Firm* — Lex IP Meister, PLLC

(57) ABSTRACT

Each of first and second glasses to be cleaned has a first edge and a second edge. A cleaning system has a cleaning member having a contact surface adapted to contact a surface of the glass, and first and second holders that hold the cleaning member. A drive system moves the holder so as to perform an outward cleaning moving from the first edge toward the second edge and a return cleaning returning from the second edge to the first edge. At a start position of the outward cleaning, the holder is stopped so that a portion of the contact surface of the cleaning member is positioned inside the first edge, and at a start position of the return cleaning, the holder is stopped so that a portion of the contact surface is positioned inside the second edge.

8 Claims, 14 Drawing Sheets

FIG. 4
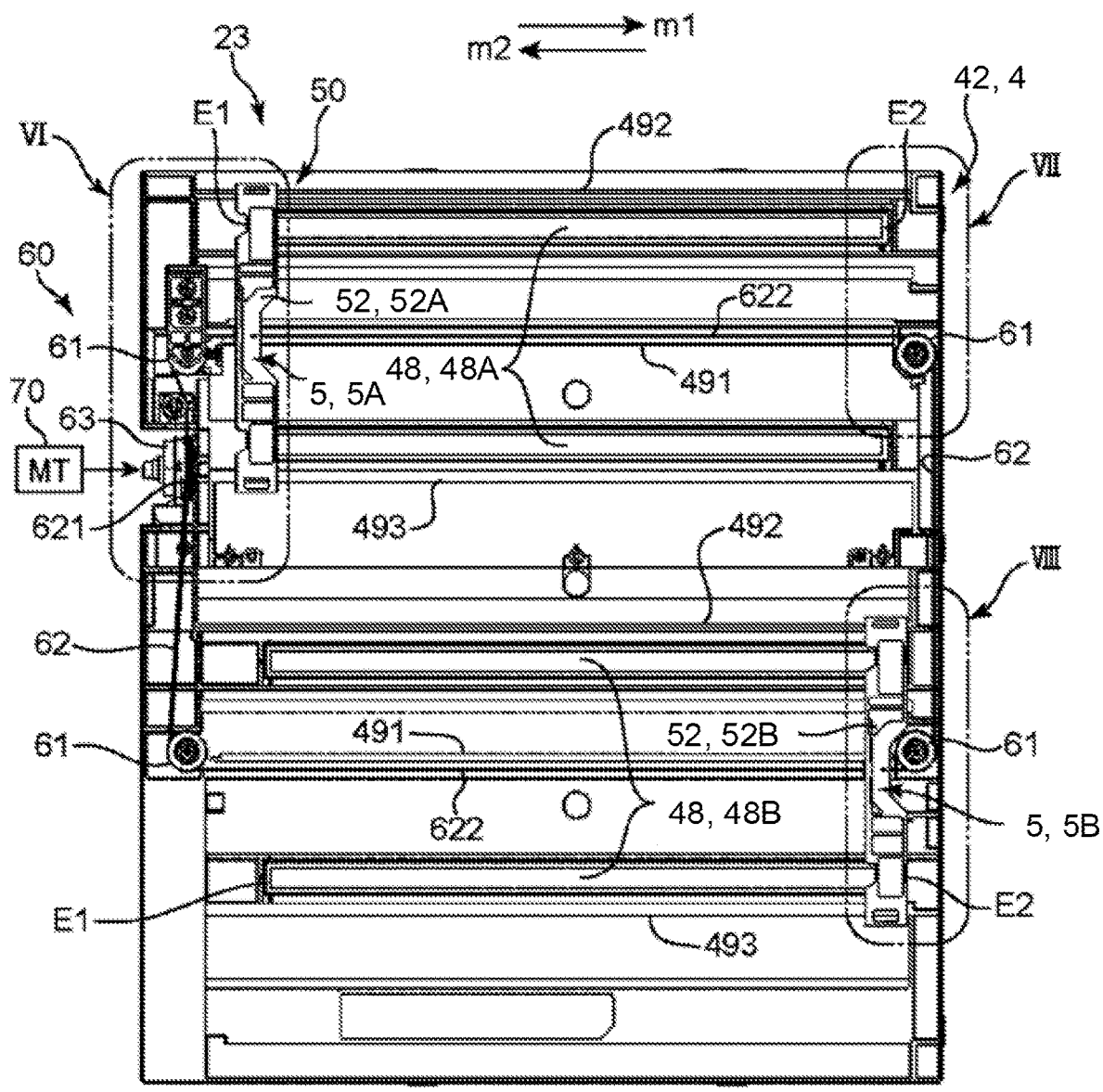
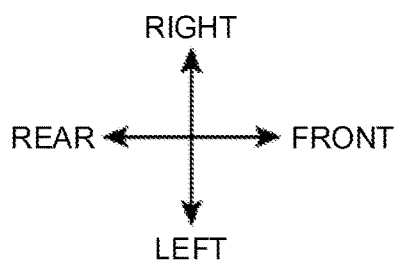

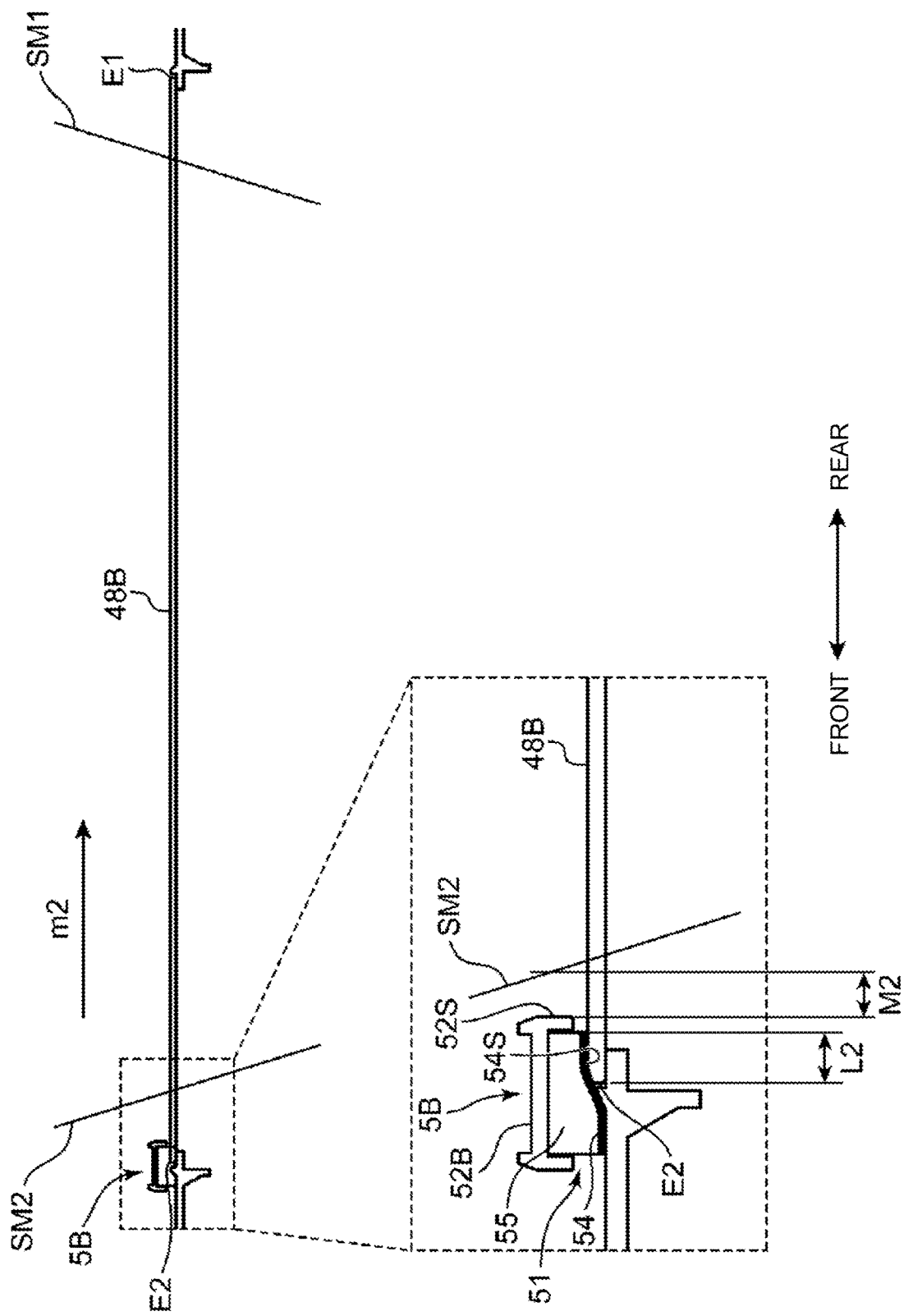

OPTICAL SCANNING DEVICE AND IMAGE FORMING DEVICE

INCORPORATION BY REFERENCE

This application is based upon, and claims the benefit of priority from, corresponding Japanese Patent Application No. 2020-100270 filed in the Japan Patent Office on Jun. 9, 2020, the entire contents of which are incorporated herein by reference.

BACKGROUND

Field of the Invention

The present disclosure relates to an optical scanning device that generates optical scanning light rays irradiated to a scanning object, and an image forming device provided with the optical scanning device.

Description of Related Art

An optical scanning device that generates a scanning light includes a scanning optical system including a light source, a polygon mirror, and a scanning lens, and a housing that houses the scanning optical system and protects the scanning optical system from any dust. The scanning light is irradiated to a specific scanning object through a window portion provided in the housing and made of transparent glass. In the case of an image forming device, the scanning object is a photoconductor drum, and an electrostatic latent image is formed on the peripheral surface of the photoconductor drum by irradiation of the scanning light.

When the window portion is contaminated, the scanning light will not be properly irradiated to the scanning object. Due to this, it is required that the window portion be cleaned automatically on a regular basis. For this automatic cleaning, the optical scanning device is provided with a cleaning system that, along the window portion, reciprocally moves a cleaning unit which includes a cleaning member for slidably contacting the window portion and a holder for holding the cleaning member. The cleaning member includes a cleaner member for contacting the window portion, and the cleaner member is held by the holder.

SUMMARY

An optical scanning device, according to a first aspect of the present disclosure includes: a housing that houses an optical system for generating an optical scanning light ray and includes a window portion for emitting the ray to outside, a cleaning system that is assembled to the housing and cleans the window portion, and a drive system that drives the cleaning system. The window portion has a first edge at a first end side in a scanning direction and a second edge at a second end side in the scanning direction, the cleaning system includes: a cleaning unit that has: a cleaning member having a contact surface to contact a surface of the window portion, and a holder that holds the cleaning member. The drive system: moves the holder so as to perform an outward cleaning moving from the first edge toward the second edge and a return cleaning returning from the second edge to the first edge, at a start position of the outward cleaning, causes the holder to be stopped so that a portion of the contact surface of the cleaning member is positioned inside the first edge, and at a start position of the return cleaning, causes the holder to be stopped so that a portion of the contact surface of the cleaning member is positioned inside the second edge.

An image forming device according to another aspect of the present disclosure, includes: an image carrier, and the optical scanning device, wherein the optical scanning device irradiates a scanning light ray to the image carrier based on image information.

BRIEF DESCRIPTION OF THE DRAWINGS

FIG. 4 is a top view of the optical scanning device;

FIG. 10 illustrates a cross-sectional view showing the position of the contact surface of the cleaning member at the start position of the outward cleaning and the return cleaning;

FIG. 12 illustrates the drive control of the cleaning unit of the second embodiment, and is a cross-sectional view of showing the cleaning member positioned at the start position of the return cleaning;

DETAILED DESCRIPTION

Embodiments of the present disclosure are described in detail based on the following drawings. The present embodiment shows an example in which an optical scanning device according to the present disclosure is applied to a color printer 1 which is an example of an image forming device. The image forming device may be a monochrome printer, a facsimile device, or a multifunction machine. The optical scanning device according to the present disclosure may be applied to a device other than the image forming device.

Overall Configuration of Image Forming Device

Figure 1:
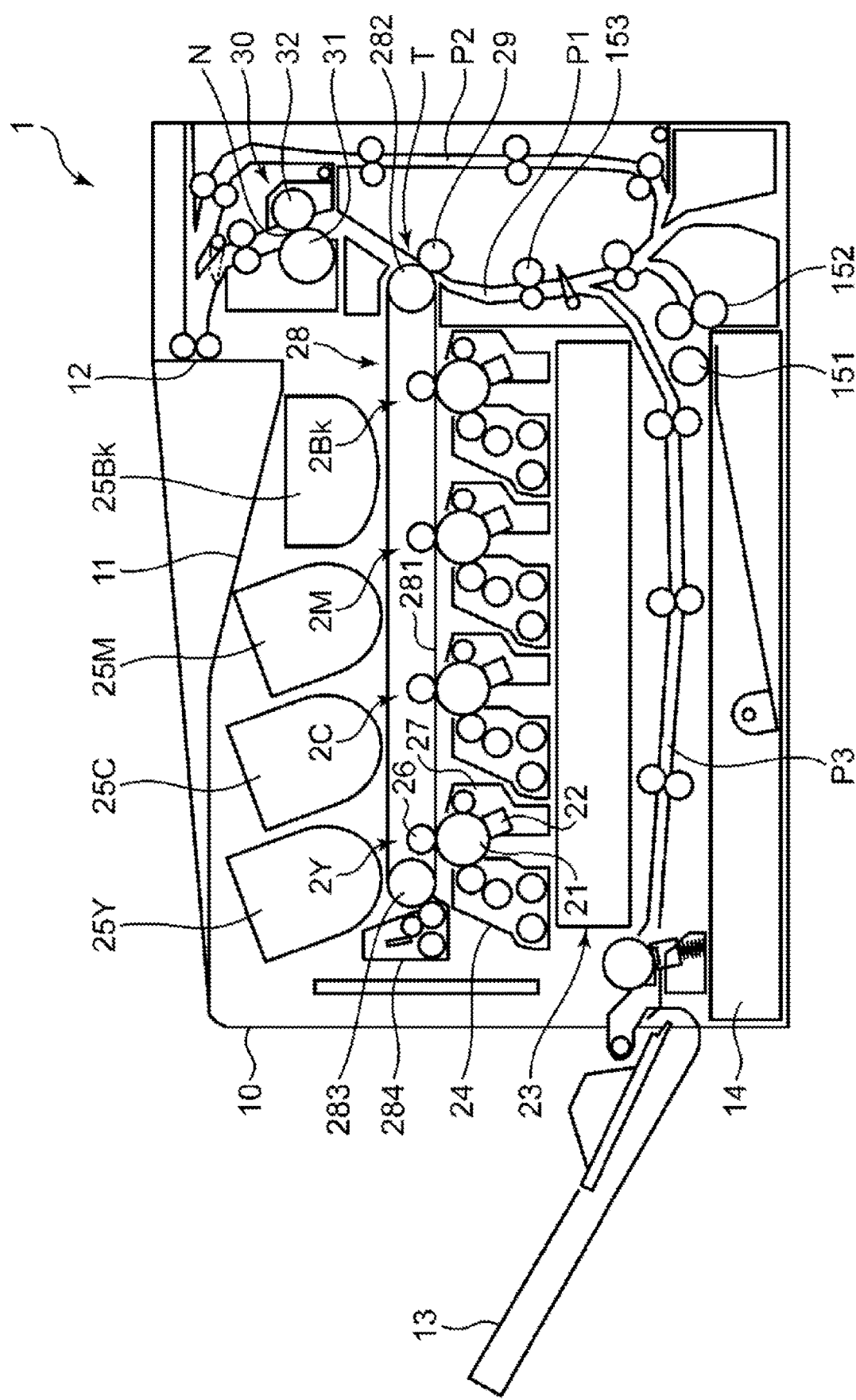
FIG. 1 is a schematic cross-sectional view illustrating an internal structure of an image forming device according to an embodiment of the present disclosure.

FIG. 1 is a schematic cross-sectional view illustrating the internal structure of the color printer 1 according to an embodiment of the present disclosure. The color printer 1 includes a body housing 10 formed of a rectangular housing, and also includes image forming units 2Y, 2C, 2M, and 2Bk, an optical scanning unit 23 (optical scanning device), an intermediate transfer unit 28, and a fixing unit 30 which are housed in the body housing 10. A paper discharge tray 11 is provided on the upper surface of the body housing 10. A sheet discharge port 12 is open opposite the paper discharge tray 11. In addition, a manual feed tray 13 is mounted to the side wall of the body housing 10 in an openable manner. A paper feed cassette 14, which houses a sheet to be subjected to image formation processing, is detachably mounted to the lower portion of the body housing 10.

The image forming units 2Y, 2C, 2M, and 2Bk form toner images of yellow, cyan, magenta, and black colors based on image information transmitted from an external device. Each of the image forming units 2Y, 2C, 2M and 2Bk includes a photoconductor drum 21 (image carrier) which carries an electrostatic latent image and a toner image, a charger 22 which charges the peripheral surface of the photoconductor drum 21, the optical scanning unit 23 which irradiates a scanning light to the photoconductor drum 21 based on the image information to thereby form an electrostatic latent image, a developer 24 which attaches a developer to the electrostatic latent image to thereby form the toner image, yellow, cyan, magenta and black toner containers 25Y, 25C, 25M and 25Bk which supply respective color toners to the developer 24, a primary transfer roller 26 which primarily transfers the toner image formed on the photoconductor drum 21, and a cleaning device 27 for removing any residual toner from the peripheral surface of the photoconductor drum 21. Of these, the optical scanning unit 23 will be described in detail below.

The intermediate transfer unit 28 primarily transfers the toner image formed on the photoconductor drum 21. The intermediate transfer unit 28 includes a transfer belt 281 that circulates while contacting the peripheral surface of each photoconductor drum 21, and a drive roller 282 and a driven roller 283 across which the transfer belt 281 is bridged. The transfer belt 281 is pressed against the peripheral surface of each photoconductor drum 21 by the primary transfer roller 26. The toner images on the photoconductor drums 21 of respective colors are superimposed on the same spot on the transfer belt 281 and primarily transferred. With this, a full-color toner image is formed on the transfer belt 281.

Opposite the drive roller 282, there is disposed a secondary transfer roller 29 which forms a secondary transfer nip portion T with the transfer belt 281 sandwiched. The full-color toner image on the transfer belt 281 is secondarily transferred onto the sheet in the secondary transfer nip portion T. Toner that remains on the peripheral surface of the transfer belt 281 without being transferred onto the sheet is collected by a belt cleaning device 284 disposed opposite the driven roller 283.

The fixing unit 30 includes a fixing roller 31 in which a heat source is built in, and a pressure roller 32 forming a fixing nip portion N together with the fixing roller 31. In the fixing nip portion N, the fixing unit 30 heats and pressurizes the sheet to which the toner image has been transferred in the secondary transfer nip portion T, thereby implementing a fixing process to weld the toner to the sheet. The sheet that has undergone the fixing process is discharged from the sheet discharge port 12 toward the paper discharge tray 11.

A sheet conveyance path for conveying the sheet is provided inside the body housing 10. The sheet conveyance path includes a main conveyance path P1 extending in the vertical direction through the secondary transfer nip portion T and the fixing unit 30. The downstream end of the main conveyance path P1 is connected to the sheet discharge port 12. A reversing conveyance path P2, which reverses and conveys the sheet during a double-sided printing, extends from the downstream end of the main conveyance path P1 to near the upstream end. Further, a manual feed sheet conveyance path P3 extending from the manual feed tray 13 to the main conveyance path P1 is arranged above the paper feed cassette 14.

The paper feed cassette 14 is provided with a sheet housing portion that houses a bundle of sheets. Near the upper right of the paper feed cassette 14, there are provided a pickup roller 151 that takes out the sheet of the top layer of the bundle of sheets one by one, and a paper feed roller pair 152 that feeds the sheet to the upstream end of the main conveyance path P1. The sheet placed on the manual feed tray 13 is also fed through the manual feed sheet conveyance path P3 to the upstream end of the main conveyance path P1. On the upstream side of the secondary transfer nip portion T of the main conveyance path P1, there is disposed a resist roller pair 153 which feeds the sheet to the transfer nip portion at a specific timing.

When the sheet is subjected to the single-sided printing (image formation) process, the sheet is fed from the paper feed cassette 14 or the manual feed tray 13 to the main conveyance path P1, and the sheet is subjected to the toner image transfer process in the secondary transfer nip portion T and subjected to the fixing process in which the transferred toner is fixed to the sheet in the fixing unit 30. Thereafter, the sheet is discharged from the sheet discharge port 12 onto the paper discharge tray 11. On the other hand, when the double-sided printing process is performed on the sheet, after the transfer process and fixing process are performed on one side of the sheet, the sheet is partially discharged from the sheet discharge port 12 onto the paper discharge tray 11. Thereafter, the sheet is conveyed in a switchback manner, passes through the reversing conveyance path P2, and is returned to near the upstream end of the main conveyance path P1. After that, the other side of the sheet is subjected to the transfer process and the fixing process, and the sheet is discharged from the sheet discharge port 12 onto the paper discharge tray 11.

Optical Scanning Unit with Cleaning System

Figure 2:
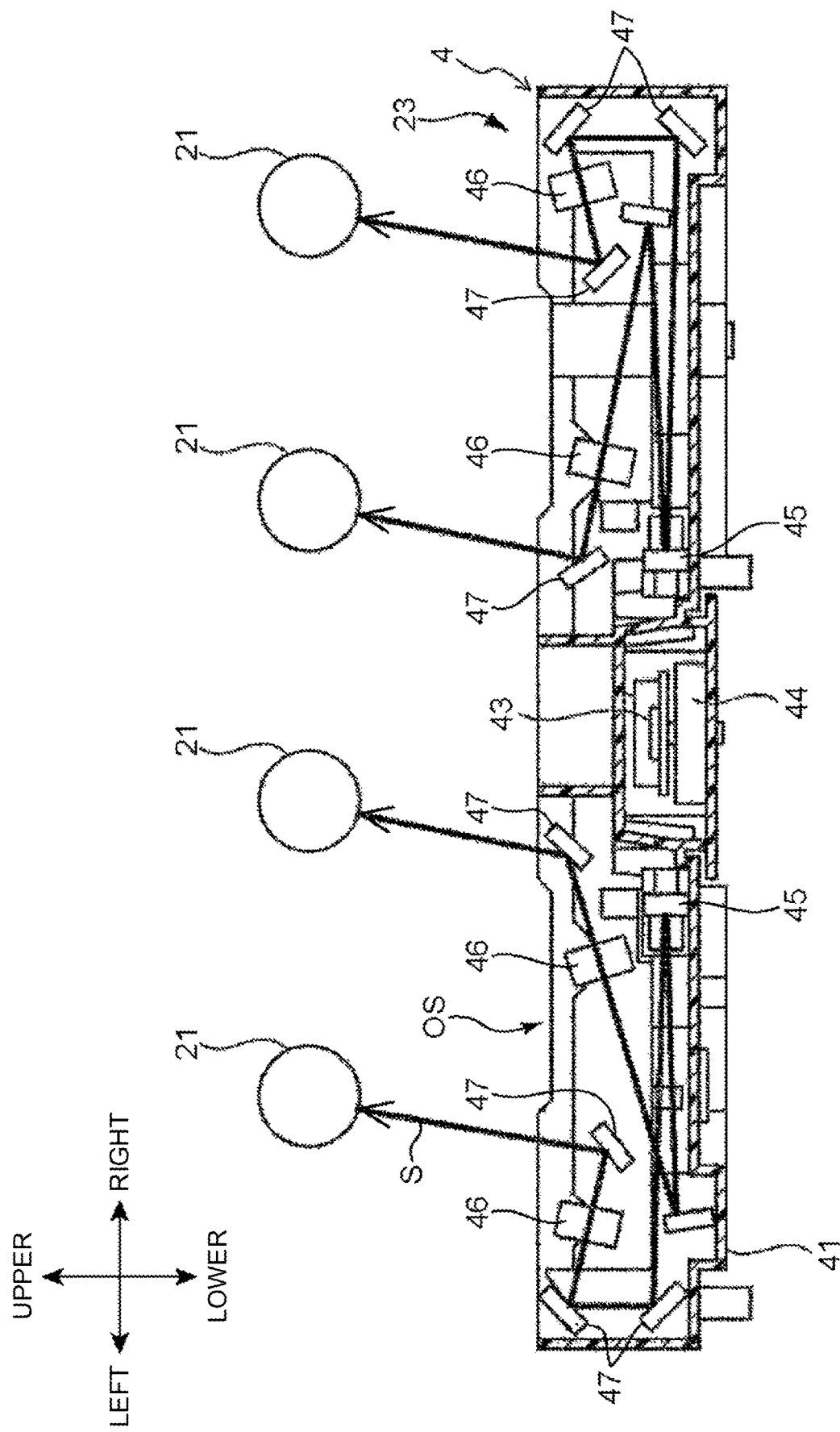
FIG. 2 is a schematic cross-sectional view illustrating an internal configuration of an optical scanning device.
Figure 3:
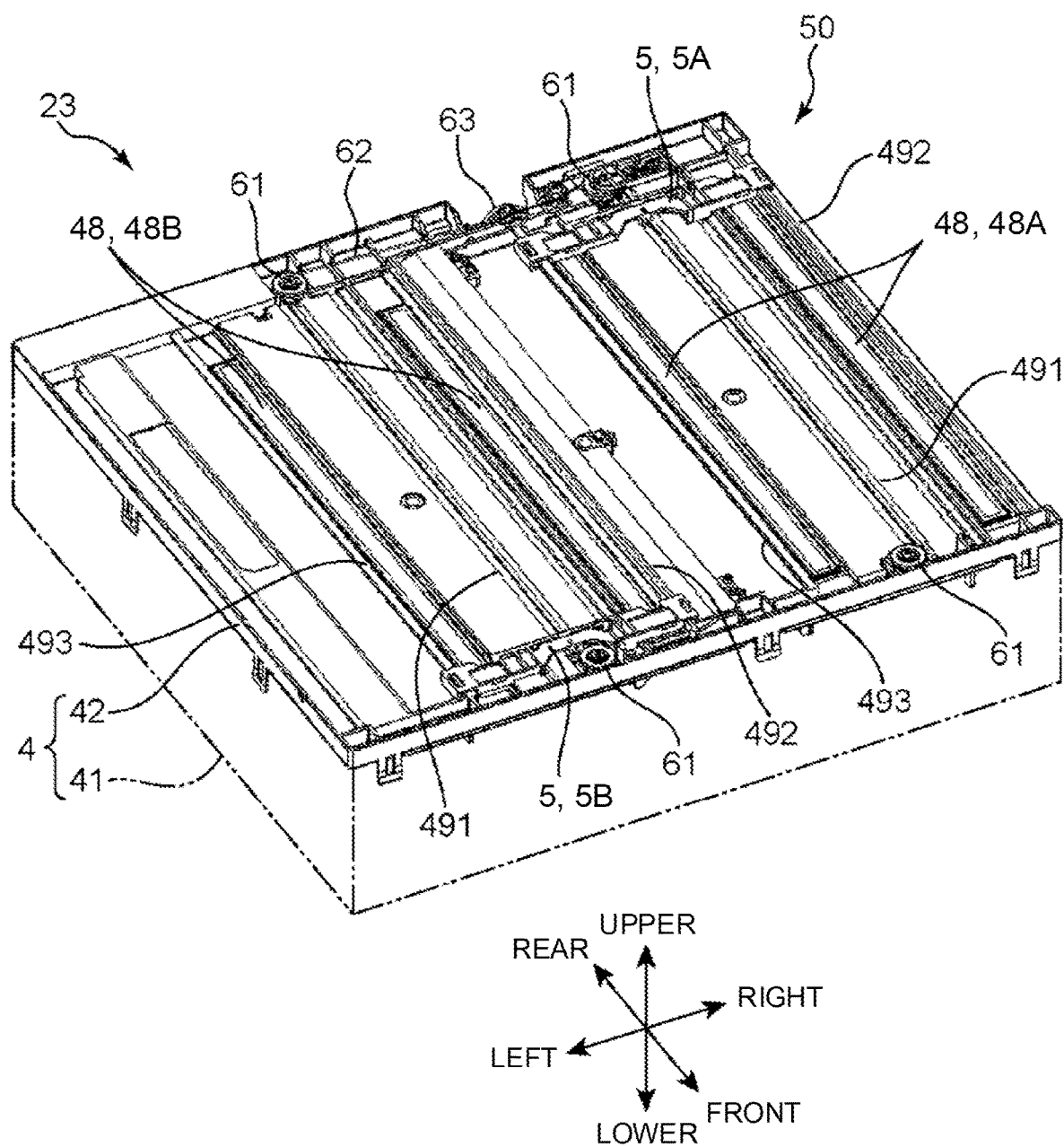
FIG. 3 is a perspective view of the optical scanning device.

Then, the optical scanning unit 23 will now be described in detail. FIG. 2 is a schematic cross-sectional view illustrating an internal configuration of the optical scanning unit 23. FIG. 3 is a perspective view of the optical scanning unit 23, and FIG. 4 is a top view thereof, respectively. The directional indications of back and forth, left and right, and up and down in FIGS. 2 to 4 are for convenience of explanation and do not necessarily correspond to the actual directions.

The optical scanning unit 23 includes an optical system OS that generates a scanning light S (a light ray for optical scanning), a housing 4 that houses the optical system OS, and a cleaning system 50 that is assembled to the housing 4. The housing 4 includes a lower housing 41 formed of a cuboid container with an open upper surface and a lid 42 sealing the opening. FIG. 2 illustrates a cross-sectional view in which the lid 42 is removed, and FIG. 3 briefly illustrates the lower housing 41 in dotted lines. The lid 42 has an emission opening for emitting the scanning light S generated by the optical system OS to the outside, and a dustproof glass 48 (window portion) is fitted in the emission opening. The cleaning system 50 is assembled to the lid 42 (housing 40) and cleans the dustproof glass 48.

Referring to FIG. 2, the optical system OS includes a light source (not illustrated), a polygon mirror 43, a polygon motor 44, a first scanning lens 45, a second scanning lens 46, and a plurality of mirrors 47. The light source includes a semiconductor laser that emits a laser beam that becomes the scanning light S. The polygon mirror 43 is a polyhedral mirror with a deflection surface formed along each side of a regular hexagon. The polygon motor 44 rotates and drives the polygon mirror 43 around a rotation axis. The polygon mirror 43 deflects the scanning light S for each color emitted from the light source while rotating around the rotation axis, and scans the peripheral surface of each photoconductor drum 21 with the scanning light S.

The first scanning lens 45 and the second scanning lens 46 are disposed between the polygon mirror 43 and the photoconductor drum 21 on the optical path of the scanning light S, and image each scanning light S onto the peripheral surface of one of the respective photoconductor drums 21. The present embodiment exemplifies the optical scanning unit 23 in which two sets of first and second scanning lenses 45, 46 are oppositely disposed across the polygon mirror 43. That is, a set of first and second scanning lenses 45, 46 is arranged for the two photoconductor drums 21 on the right (for example, for magenta and black), and another set of first and second scanning lenses 45, 46 is arranged for the two photoconductor drums 21 on the left (for example, for yellow and cyan). The first and second scanning lenses 45 and 46 are lenses having a distortion aberration (fθ characteristic) in which the angle of the incident light and the image height are in a proportional relation. Toward the respective photoconductor drums 21, the plurality of mirrors 47 reflect the scanning lights S deflected by the polygon mirror 43.

Referring to FIGS. 3 and 4, four of the dustproof glasses 48 are mounted on the lid 42, corresponding to the four colored photoconductor drums 21. The four dustproof glasses 48 each have a rectangular shape that is long in the scanning direction (front-rear direction) and are arranged in parallel at a specific interval in the left-right direction. The two dustproof glasses 48 on the right side (hereinafter sometimes referred to as "first glass 48A") allow the scanning lights S for magenta and black, for example, to pass through, and the two dustproof glasses 48 on the left side (hereinafter sometimes referred to as "second glass 48B") allow the scanning lights S for yellow and cyan, for example, to pass through.

In the lid 42, a central groove 491 extending in a front-to-rear direction is formed between the two first glasses 48A and between the two second glasses 48B, respectively. A right guide rail 492 extending in a front-rear direction is provided on the right outer side of the first and second glasses 48A, 48B, and a left guide rail 493 extending in a front-rear direction is provided on the left outer side. The central groove 491, the right guide rail 492 and the left guide rail 493 extend generally over the entire length of the lid 42 from the front end to the rear end, and are also disposed parallel to the longitudinal direction of the first and second glasses 48A, 48B. For the first and second glasses 48A, 48B, the rear end side (one end side in the scanning direction) is hereinafter referred to as a first edge E1 and the front end side (the other end side in the scanning direction) as a second edge E2.

Figure 5:
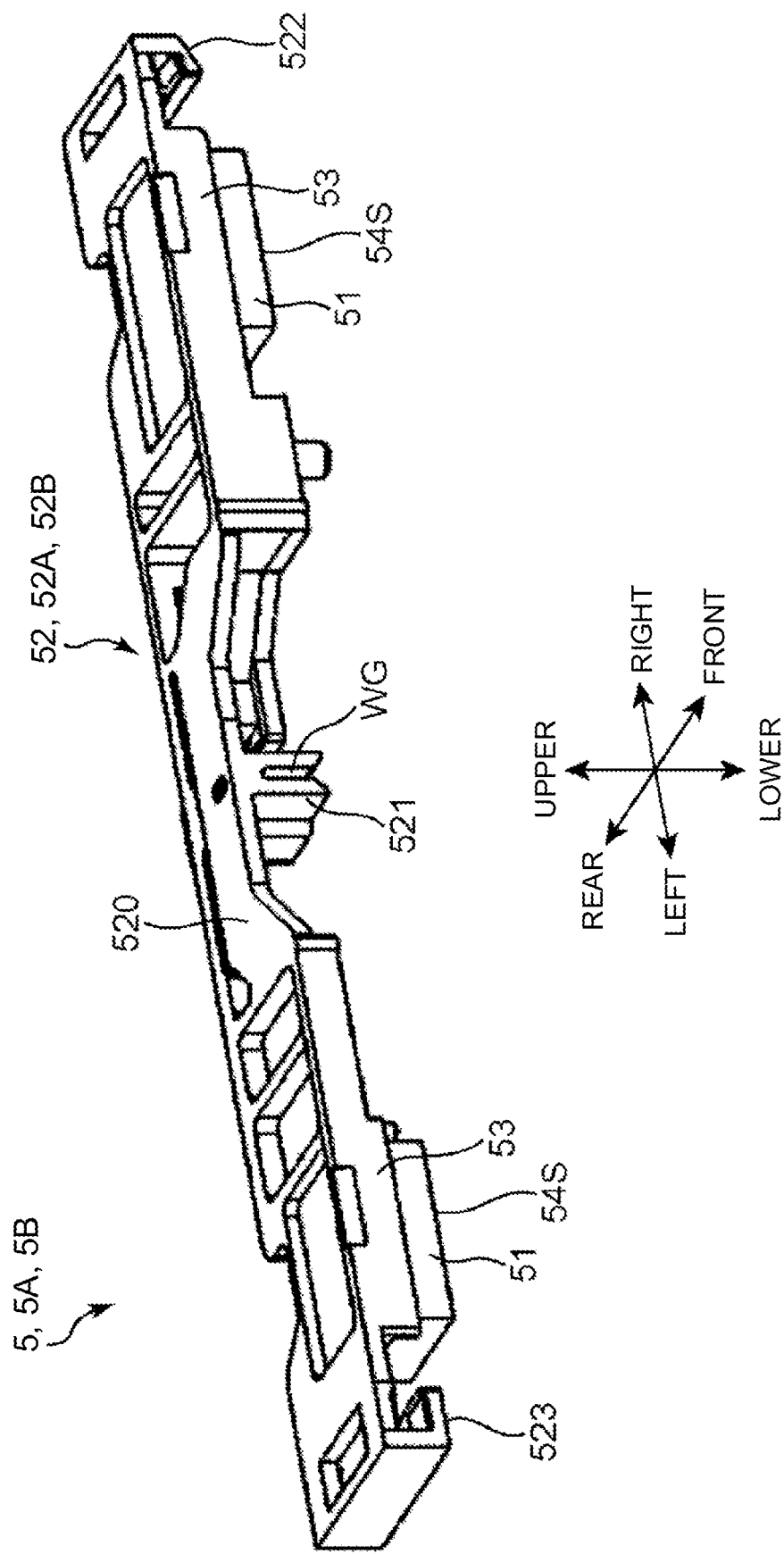
FIG. 5 is a perspective view of a cleaning unit.

The cleaning system 50 includes two cleaning units 5 (a first cleaning unit 5A and a second cleaning unit 5B). In this embodiment, the first cleaning unit 5A is arranged for cleaning the two first glasses 48A (first window portion), and the second cleaning unit 5B is arranged for cleaning the two second glasses 48B (second window portion). FIG. 5 is a perspective view of the cleaning unit 5 (5A, 5B). The cleaning unit 5 includes a cleaning member 51 that slidably contacts the dustproof glass 48 and cleans the dustproof glass 48, and a holder 52 (first holder 52A, second holder 52B) that holds the cleaning member 51.

Two cleaning members 51 are held per cleaning unit 5, one for each of the two first glasses 48A or two second glasses 48B. The cleaning member 51 has a cuboid shape, and its lower surface is a contact surface 54S that is adapted to contact each of the surfaces of the first and second glasses 48A and 48B.

The holder 52 includes a holder body 520, a coupling boss portion 521, a right guide portion 522, a left guide portion 523, and a holding recess portion 53. The holder body 520 is a frame member that is long in the left-right direction. The left-right width of the holder body 520 is longer than the left-right aligned width of the two first glasses 48A or the two second glasses 48B. The coupling boss portion 521 is provided to protrude at the lower portion of the holder body 520 in the center in the left-right direction. The coupling boss portion 521 is provided with a wire groove WG into which a drive wire 62 described below is tightly fitted. The right guide portion 522 is a hook-shaped engagement portion provided on the right end side of the holder body 520. The left guide portion 523 is a hook-shaped engagement portion provided on the left end side of the holder body 520.

The coupling boss portion 521 is play-fitted into the central groove 491 of the lid 42. The right guide portion 522 is engaged with the right guide rail 492 and the left guide portion 523 is engaged with the left guide rail 493 in a manner to be respectively fitted thereto from the outside. Accordingly, the holder 52 can move in a forward or rearward direction, while being guided by the right and left guide rails 492 and 493, and with the coupling boss portion 521 being guided by the central groove 491.

The holding recess portions 53 are portions that hold the cleaning members 51 and are respectively disposed on the right side and the left side of the holder body 520. The cleaning member 51 is held in the holding recess portion 53 in such a manner that the upper end region of the cleaning member 51 is fitted into the holding recess portion 53. For example, a double-sided tape or an adhesive is interposed between the upper surface of the cleaning member 51 and the holding recess portion 53, and the two are joined together. The position of arranging the holding recess portion 53 corresponds to the dustproof glass 48. For example, in the case of the first cleaning unit 5A, the holding recess portions 53 are disposed at a position facing the right side and a position facing the left side of the two first glasses 48A, respectively, when the holder 52 is fitted to the right and left guide rails 492 and 493. The lower surface of the cleaning member 51 held in the holding recess portion 53 is the contact surface 54S which is caused to contact the surface of the dustproof glass 48 with a specific pressing force.

Drive System of Cleaning System

The optical scanning unit 23 is provided with a drive system 60 that drives the cleaning system 50 described above. Referring mainly to FIG. 4 above and FIG. 6 which is an enlarged view of an arrow VI portion of FIG. 4, the drive system 60 will be described. The drive system 60 is provided with a pulley 61, a drive wire 62 (interlocking member), a drive transmission member 63, a motor 70 (drive source), a drive gear 71, and a control unit 72.

The motor 70 is disposed within the body housing 10 of the printer 1 and generates a rotational driving force of forward or reverse rotation. The drive gear 71 is mounted to an output shaft of the motor 70. The control unit 72 executes drive control of the motor 70, including the forward or reverse rotation switching, the rotation period, and the rotation speed.

A total of four pulleys 61 are disposed on the upper surface of the lid 42. That is, the pulleys 61 are disposed at the front and rear end sides of the lid 42, and at the front and rear end positions of the two central grooves 491, respectively. The drive wire 62 is an unterminated wire stretched over the four pulleys 61. The drive wire 62 is a member that interlocks the first holder 52A of the first cleaning unit 5A with the second holder 52B of the second cleaning unit 5B. The wire groove WG provided for the coupling boss portion 521 of each of the first holder 52A and the second holder 52B (FIG. 5) is fitted to and fixed to the drive wire 62. Accordingly, when the drive wire 62 moves circumferentially, the first and second holders 52A and 52B move in an interlocked manner.

The drive transmission member 63 is a member that transmits a driving force of circumferential movement to the drive wire 62. The drive transmission member 63 is supported by the lid 42 so as to be rotatable around an axis. The drive transmission member 63 includes a gear portion 631 and a drive wheel portion 632. The gear portion 631 meshes with the drive gear 71 on the motor 70 side. Although the gear portion 631 and the drive gear 71 are spaced apart from each other in FIG. 6, the gear portion 631 meshes with the drive gear 71 when the optical scanning unit 23 is mounted on the body housing 10. When the drive gear 71 which is given the driving force from the motor 70 rotates, the drive transmission member 63 which meshes with the drive gear 71 at the gear portion 631 rotates around a rotation axis of the drive transmission member 63. The drive wheel portion 632 is a portion around which the drive wire 62 is hung.

The drive wire 62 has a wound portion 621 that is hung around the circumference of this drive wheel portion 632 and an in-groove portion 622 that is housed in the central groove 491. When the drive transmission member 63 rotates, the drive wire 62 is given a propulsive force at the drive wheel portion 632, and the drive wire 62 moves along the circumferential path defined by the four pulleys 61. One pulley 61 is provided with a tension adjustment portion 623 that gives a proper tension to the drive wire 62.

Figure 7:
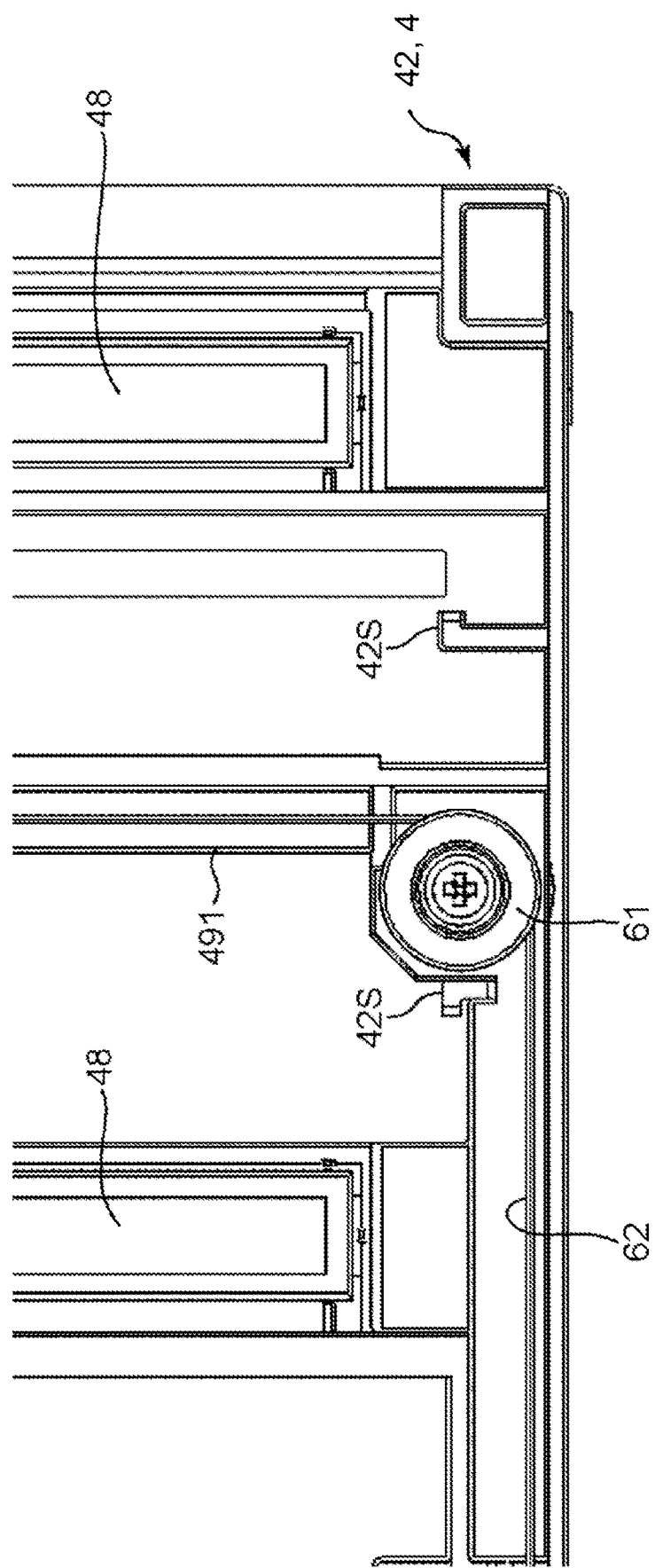
FIG. 7 is an enlarged view of an arrow VII portion of FIG. 4.
Figure 8:
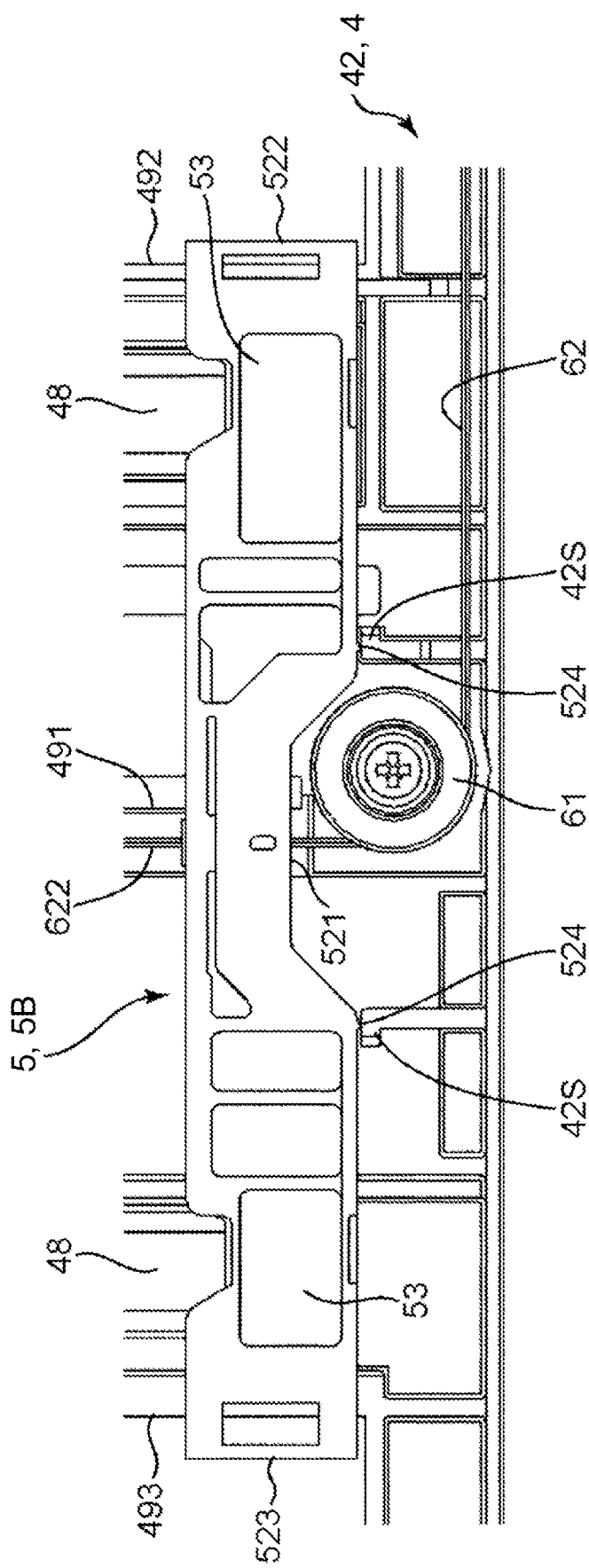
FIG. 8 is an enlarged view of an arrow VIII portion of FIG. 4.

FIG. 7 is an enlarged view of an arrow VII portion of FIG. 4, i.e., near the second edge E2 of the first glass 48A on the right side. FIG. 8 is an enlarged view of an arrow VIII portion of FIG. 4, i.e., near the second edge E2 of the second glass 48B on the left side. Near the front end of the lid 42, there are provided a pair of stoppers 42S that contacts and stops the first cleaning unit 5A and a pair of stoppers 42S that contacts and stops the second cleaning unit 5B. The pair of stoppers 42S are ribs provided to protrude on the upper surface of the lid 42, and are disposed in pairs on the left and right sides so as to sandwich the alignment line of the central groove 491. No stopper is disposed near the rear end of the lid 42.

Figure 6:
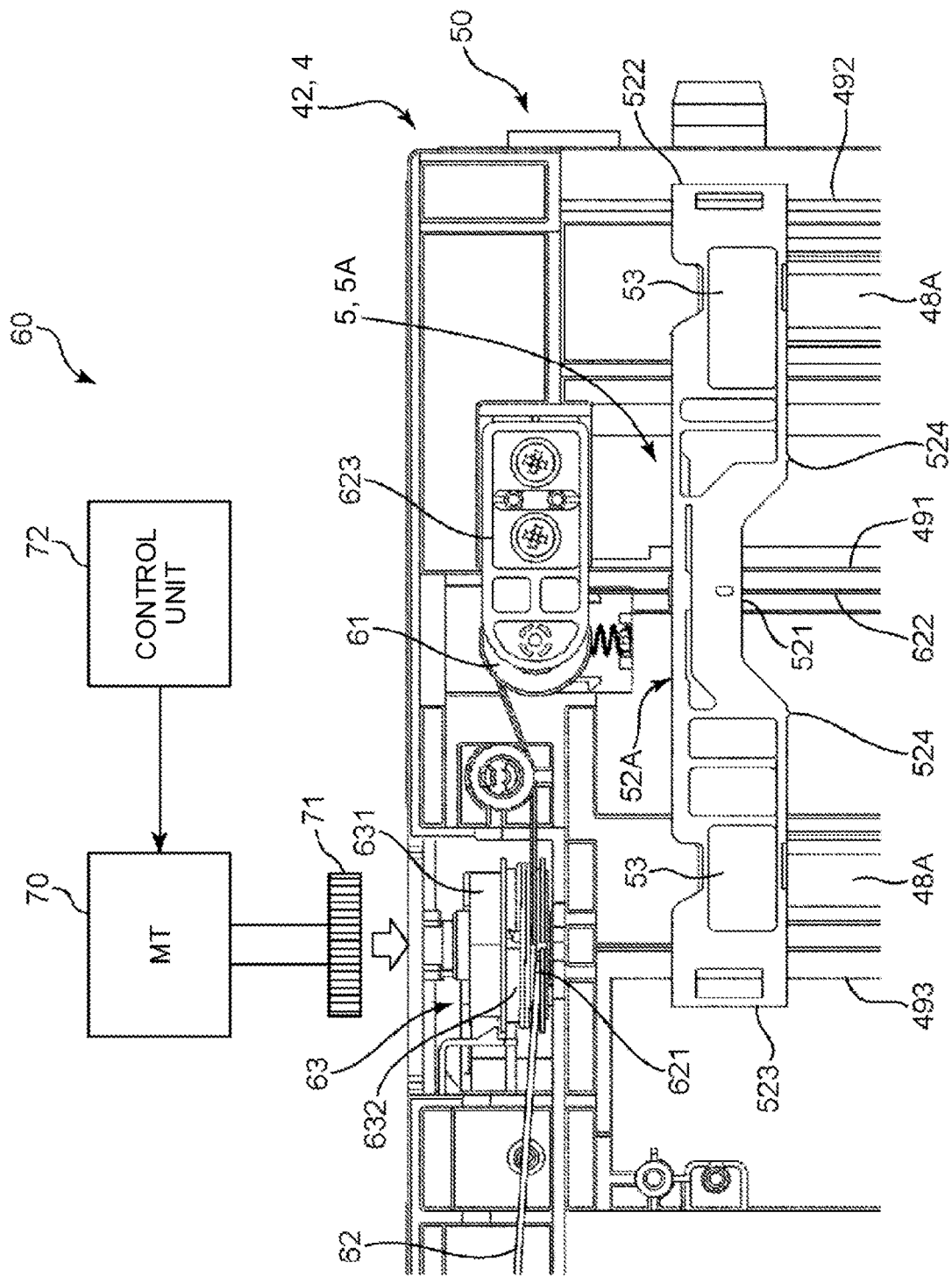
FIG. 6 is an enlarged view of an arrow VI portion of FIG. 4.

A pair of small protrusions 524 are formed on the front side surfaces of the first and second holders 52A, 52B of the first and second cleaning units 5A, 5B (FIG. 6). The pair of small protrusions 524 is provided to protrude at a position corresponding to the pair of stoppers 42S. FIG. 8 illustrates a state in which the small protrusion 524 of the second holder 52B positioned on the second edge E2 side contacts and is stopped by the stopper 42S.

In this embodiment, sensors for sensing positions of the first and second cleaning units 5A and 5B are not arranged. As an alternative, the control unit 72 monitors the motor current supplied to the motor 70. When either the first cleaning unit 5A or the second cleaning unit 5B contacts and is stopped by the stopper 42S, the motor 70 is locked and the motor current rises rapidly. With this sudden increase in motor current being detected for a specific period, the control unit 72 finds that any one of the first and second cleaning units 5A and 5B has moved to the second edge E2 and the other has moved to the first edge E1.

Referring to FIG. 4, the cleaning performed by the drive system 60 while moving the first and second holders 52A, 52B of the first and second cleaning units 5A, 5B from the first edge E1 to the second edge E2 of the first and second glasses 48A, 48B is defined as an outward cleaning m1, and the cleaning performed while moving back from the second edge E2 to the first edge E1 is defined as a return cleaning m2. The first and second cleaning units 5A and 5B, each mounted to the drive wire 62, are interlocked as follows. When the first cleaning unit 5A performs the outward cleaning m1 from the first edge E1 to the second edge E2 of the first glass 48A, the second cleaning unit 5B is interlocked to perform the return cleaning m2 from the second edge E2 to the first edge E1 of the second glass 48B. When the first cleaning unit 5A performs the return cleaning m2 from the second edge E2 to the first edge E1 of the first glass 48A, the second cleaning unit 5B is interlocked to perform the outward cleaning m1 from the first edge E1 to the second edge E2 of the second glass 48B.

For example, assume that when the motor 70 rotates positively to thereby drive the drive transmission member 63, the drive wire 62 illustrated in FIG. 4 moves circumferentially in a clockwise direction. In the case of the drive of positive rotation, the first cleaning unit 5A fixed to the drive wire 62 moves from the first edge E1 to the second edge E2 while being guided by the right and left guide rails 492 and 493 (execution of the outward cleaning m1). At the end position of the outward cleaning m1, the first cleaning unit 5A contacts and is stopped by the stopper 42S. On the other hand, the second cleaning unit 5B moves from the second edge E2 to the first edge E1 while being guided in the same manner (execution of the return cleaning m2). In contrast, when the motor 70 rotates in reverse to thereby drive the drive transmission member 63, the first cleaning unit 5A moves from the second edge E2 to the first edge E1 (execution of the return cleaning m2) and the second cleaning unit 5B moves from the first edge E1 to the second edge E2 (execution of the outward cleaning m1). At the end position of the outward cleaning m1, the second cleaning unit 5B contacts and is stopped by the stopper 42S.

During the movement of the first and second cleaning units 5A, 5B, the contact surface 54S of each of the cleaning members 51 slidably moves in front-rear direction on the surface of one of the first and second glasses 48A, 48B. The first and second cleaning units 5A and 5B move back and forth between the first edge E1 and the second edge E2. In this way, the first and second glasses 48A, 48B are cleaned.

Cleaning Member and Stop Position Thereof

Figure 9A:
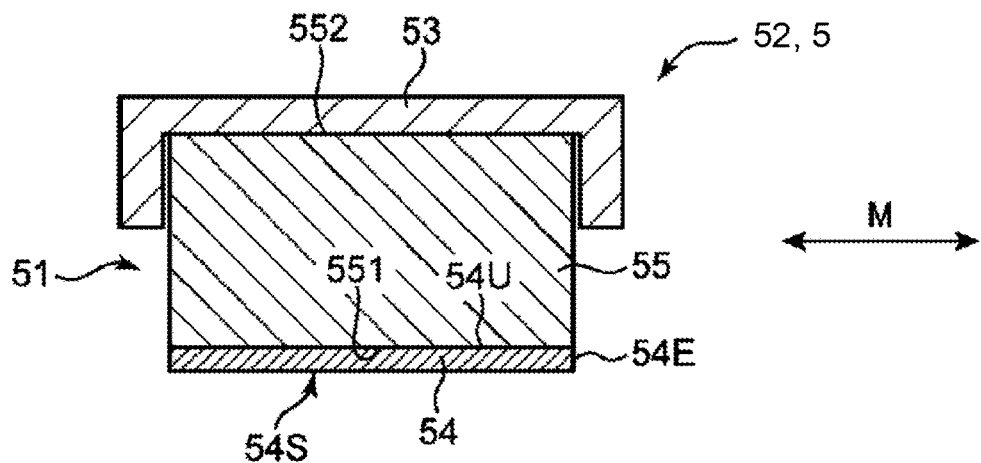
FIG. 9A is a side cross-sectional view of the cleaning member.

FIG. 9A is a side cross-sectional view of the cleaning member 51. The cleaning member 51 includes a cleaner member 54 that is adapted to contact the surface of the dustproof glass 48 (first and second glasses 48A, 48B) and a pressing member 55 formed of an elastic body. The arrow in the figure indicates a movement direction M of the holder 52. The cleaning member 51 moves back and forth in the movement direction M while being held in the holding recess portion 53. During the movement of the cleaning member 51, the cleaner member 54 slidably contacts the dustproof glass 48 and cleans the surface of the dustproof glass 48 in a manner to wipe off any dirt on the surface.

As the cleaner member 54, for example, a sheet piece made of felt, non-woven fabric, or the like can be used. As the pressing member 55, for example, a rubber or rubber sponge such as urethane rubber, or a resin block piece having the required elasticity can be used.

The pressing member 55 has a cuboid shape and has a lower surface 551 and an upper surface 552 which is a surface opposite to the lower surface 551. The lower surface 551 is a pressing surface that presses the cleaner member 54 toward the dustproof glass 48. The cleaner member 54 is adhered to the lower surface 551 by using, for example, a double-sided tape or an adhesive. The upper surface 552 is a surface that is mounted to the holding recess portion 53. For example, the upper surface 552 is adhered to the holding recess portion 53 by using adhesive means such as double-sided tape or adhesive, or mechanical engagement means.

The cleaner member 54 includes the contact surface 54S which is the lower surface of the sheet piece, and a joining surface 54U which is the upper surface of the sheet piece. The contact surface 54S is a surface that is adapted to contact the surface of the dustproof glass 48. The joining surface 54U is a surface that is adhered to the lower surface 551 of the pressing member 55. The cleaner member 54 is given a pressing force from the holder 52 via the pressing member 55. The pressing force of the holder 52 is generated from its engagement with the right and left guide rails 492 and 493. The pressing force is equalized by the intervention of the pressing member 55, and the entire surface of the contact surface 54S can be caused to contact the surface of the dustproof glass 48 with an equal pressure. Accordingly, the dustproof glass 48 can be cleaned well without causing the cleaner member 54 to make an uneven contact or the like.

Figure 9B:
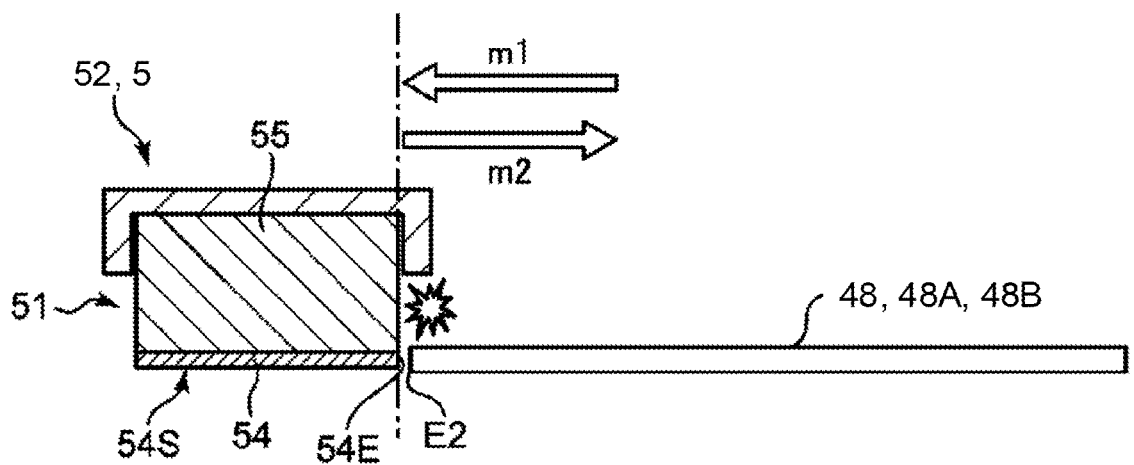
FIG. 9B is a schematic view illustrating a comparative example of drive control of the cleaning unit.

FIG. 9B is a schematic view illustrating a comparative example of drive control of the cleaning unit 5. In the drive control of the comparative example, peeling or rolling of the cleaner member 54 from the pressing member 55 may occur. As described above, the cleaning member 51 performs the outward cleaning m1 and the return cleaning m2, which move back and forth on the dustproof glass 48. In the outward cleaning m1 of the comparative example, the cleaning member 51 is moved until exceeding the second edge E2 of the dustproof glass 48. Therefore, in the state in which the outward cleaning m1 is completed, that is, at the start position of the return cleaning m2, the contact surface 54S of the cleaning member 51 is in a position away from on the dustproof glass 48.

In the subsequent return cleaning m2, the cleaning member 51 is moved in the direction opposite to that of the outward cleaning m1. During its initial movement, the cleaning member 51 rides up from the second edge E2 onto the dustproof glass 48. Here, the dustproof glass 48 is mounted to the lid 42 in a manner that the dustproof glass 48 is placed on an opening edge, for the passage of the scanning light S, provided on the lid 42. Due to this, a step is created at the second edge E2 of the dustproof glass 48 (the same applies to the first edge E1). Accordingly, when the cleaning member 51 rides up on the dustproof glass 48, a side end edge 54E of the cleaner member 54 collides with the second edge E2. This collision may cause the cleaner member 54 to detach or roll up from the lower surface 551 of the pressing member 55.

Figure 9C:
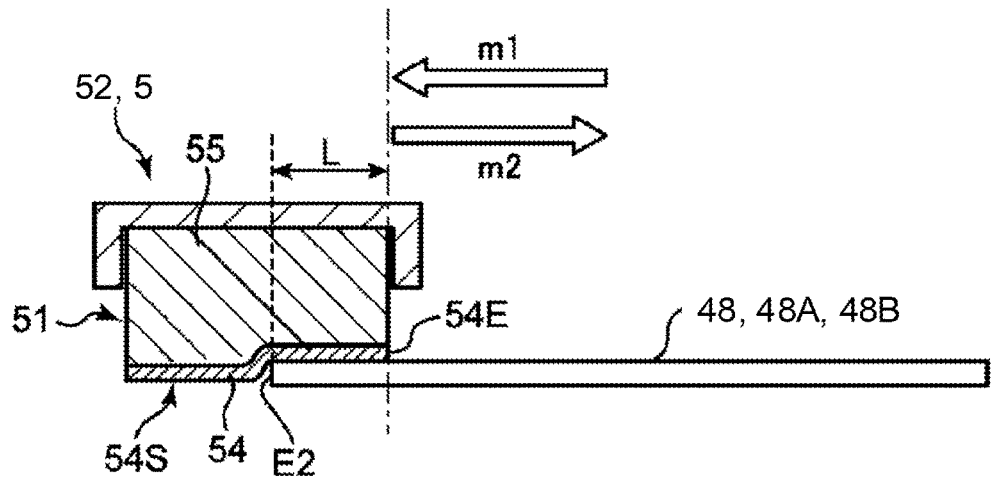
FIG. 9C is a schematic view illustrating a basic embodiment of drive control of the cleaning unit.

FIG. 9C is a schematic view illustrating a basic embodiment of drive control of the cleaning unit 5 in the present disclosure. The position of the cleaning member 51 illustrated in FIG. 9C is the end position of the outward cleaning m1 and the start position of the return cleaning m2. That is, in the outward cleaning m1 of this embodiment, the holder 52 is stopped at a position where the cleaning member 51 does not exceed the second edge E2 of the dustproof glass 48. At this time, a portion of the contact surface 54S of the cleaning member 51 (at the rear end side in the movement direction) is in a state of riding up on the dustproof glass 48. That is, the contact surface 54S is in contact with the dustproof glass 48 with a specific contact amount L in the movement direction M. From this state, the return cleaning m2 will be started.

In the present embodiment, the control unit 72 controls the drive of the motor 70 so that the holder 52 performs the following operations. First, at the end position of the outward cleaning m1 and the start position of the return cleaning m2, the holder 52 is stopped in a state in which a portion of the contact surface 54S of the cleaning member 51 is positioned inside the second edge E2 as illustrated in FIG. 9C. In fact, the holder 52 stops by contacting the stopper 42S. The contact amount L, which is the distance from the second edge E2 to the side end edge 54E, is set based on various technical viewpoints, as will be described in detail below. At the end position of the return cleaning m2 and the start position of the outward path cleaning m1, the holder 52 is stopped in a state in which a portion of the contact surface 54S is positioned inside the first edge E1.

As described above, in the present embodiment, the contact surface 54S does not completely separate outside the first edge E1 at the start position of the outward cleaning m1, and the contact surface 54S does not completely separate outside the second edge E2 at the start position of the return cleaning m2. Therefore, immediately after the start of the outward cleaning m1 or immediately after the start of the return cleaning m2, no interference is caused between the first edge E1 or the second edge E2 and the side end edge 54E of the cleaner member 54, as illustrated in the comparative example of FIG. 6B. Therefore, according to the present embodiment, peeling or rolling, of the cleaner member 54, from the pressing member 55 can be prevented, and the cleaning capability of the cleaning member 51 is not reduced.

First Embodiment

Figure 10:
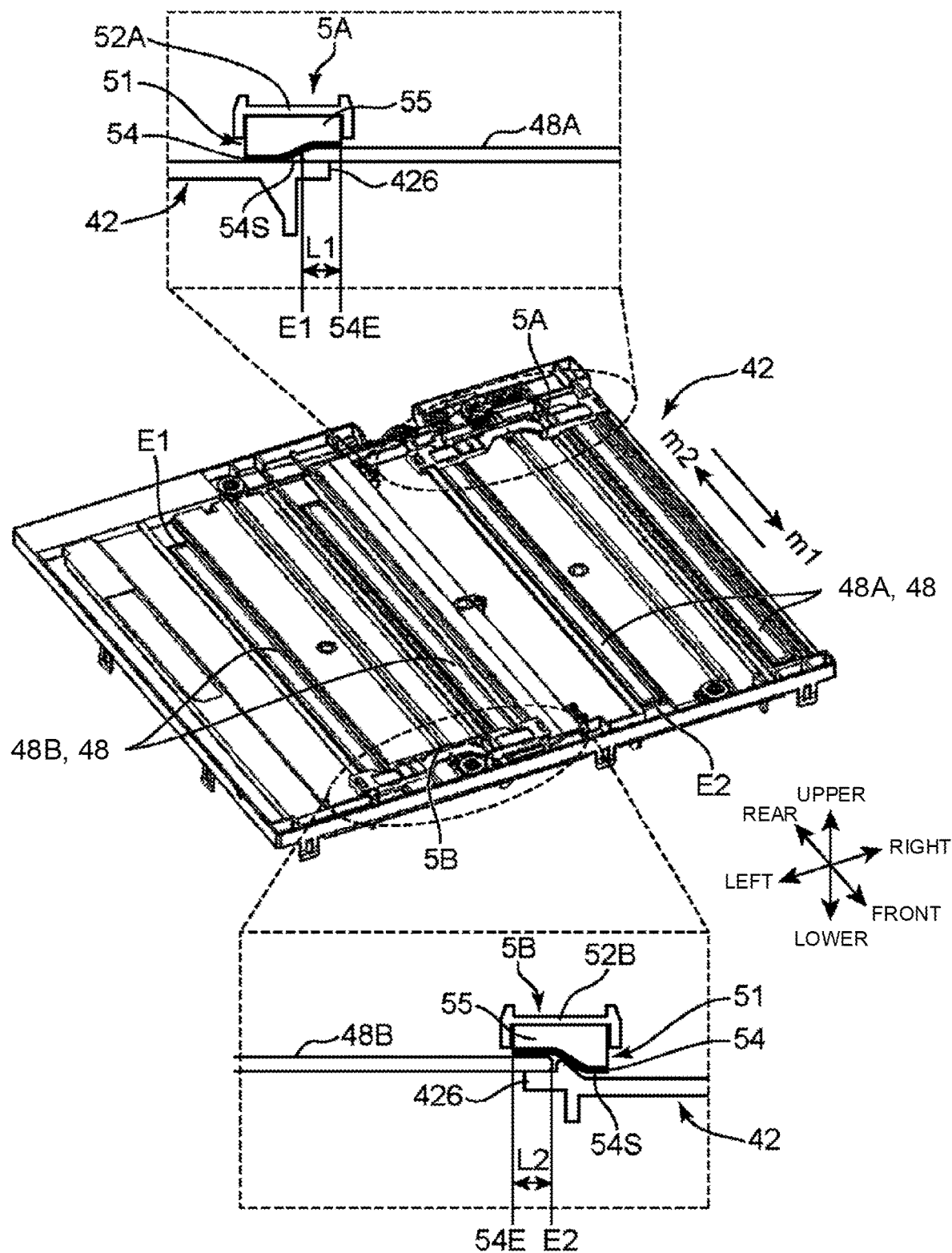
FIG. 10 illustrates a first embodiment, in which in addition to the perspective view of the lid of the housing.

FIG. 10 illustrates a specific first embodiment of a drive control of the cleaning unit 5. In addition to the perspective view of the lid 42 of the housing 4, FIG. 10 illustrates a cross-sectional view showing the position of the contact surface 54S of the cleaning member 51 at the start position of the outward cleaning m1 and the return cleaning m2. The first cleaning unit 5A on the right side is being stopped at the start position, of the outward cleaning m1, on the first edge E1 side of the first glass 48A. In contrast, the second cleaning unit 5B on the left side is being stopped at the start position, of the return cleaning m2, on the second edge E2 side of the second glass 48B.

The cleaning member 51 of the first cleaning unit 5A stands by at a position where the first glass 48A in the vicinity of the first edge E1 is in contact with a portion of the contact surface 54S. In detail, the contact surface 54S is in contact with the first glass 48A at a first contact amount L1 equivalent to the distance between the first edge E1 and the forward side end edge 54E of the cleaner member 54. At the portion, outside the first edge E1, which is separated from the first glass 48A, no compressive force is applied to the pressing member 55 formed of an elastic body, and the pressing member 55 is extended downwardly at a free length. On the other hand, at the portion of contact with the first glass 48A, the pressing member 55 formed of an elastic body is compressed by the compressive force applied from the contact surface 54S. The compression amount is roughly equivalent to the thickness of the first glass 48A placed on an opening edge 426 of the lid 42. The same as above applies when the second cleaning unit 5B stops at the start position of the outward cleaning m1.

On the other hand, the cleaning member 51 of the second cleaning unit 5B stands by at a position where the second glass 48B in the vicinity of the second edge E2 is in contact with a portion of the contact surface 54S. In detail, the contact surface 54S is in contact with the second glass 48B at a second contact amount L2 equivalent to the distance between the second edge E2 and the rear side end edge 54E of the cleaner member 54. At the portion where the pressing member 55 contacts the second glass 48B, the pressing member 55 of the cleaning member 51 of the second cleaning unit 5B is also in a compressed state. The same as above applies when the first cleaning unit 5A stops at the start position of the return cleaning m2.

The first contact amount L1 and the second contact amount L2 can be set arbitrarily. For example, the drive system 60 can move the first and second holders 52A, 52B (or set the position of the stopper 42S) so that L1=L2. However, it is desirable to move the first and second holders 52A and 52B so that L1≠L2. By making either one of L1 or L2 larger than the other, an assembly error or component tolerance of the cleaning system 50 and the drive system 60 can be absorbed with a margin by the one having the larger contact amount. For example, the first contact amount L1 may be relatively small with the first edge E1 on the origin side, and the second contact amount L2 may be relatively large with the second edge E2 on the error absorption side.

The cleaning system 50 and the drive system 60, for example, clean the dustproof glass 48 every time the printer 1 performs image forming operations of about one thousand of sheets to several thousands of sheets. During an interval of the cleaning, the first and second cleaning units 5A and 5B are stopped in the standby position on the first edge E1 side or the second edge E2 side. During the cleaning, the first and second cleaning units 5A and 5B are moved back and forth to thereby perform the outward cleaning m1 and the return cleaning m2. Thereafter, the first and second cleaning units 5A and 5B are again in the standby state.

Focusing on the first cleaning unit 5A, assume that the start position of the outward cleaning m1 is set to the standby position of the first cleaning unit 5A in the period when the first glass 48A is not cleaned. During the stand-by period, the portion of the contact surface 54S of the cleaning member 51 rides up on the first glass 48A in the vicinity of the first edge E1. The riding portion is subjected to receiving the compressive force for a long period during the cleaning interval, and the pressing member 55 may be deformed. If the pressing member 55 is deformed, the cleaner member 54 cannot be pressed evenly, and the uneven contact of the contact surface 54S may occur.

In this case, for the first cleaning unit 5A, it is desirable that the drive system 60 should move the first holder 52A so as to satisfy the relation of L1<L2. With the relation of L1<L2, the length of the contact surface 54S riding on the first glass 48A at the first edge E1 side, which is the standby position, can be made relatively short. With this, the area in which the pressing member 55 of the cleaning member 51 receives the compressive force can be reduced, and deformation of the pressing member 55 can be suppressed. For the second cleaning unit 5B, the standby position is on the second edge E2 side. Therefore, the relation of L1>L2 is good for deterring the pressing member 55 from causing a compressive deformation.

Second Embodiment

Figure 11:
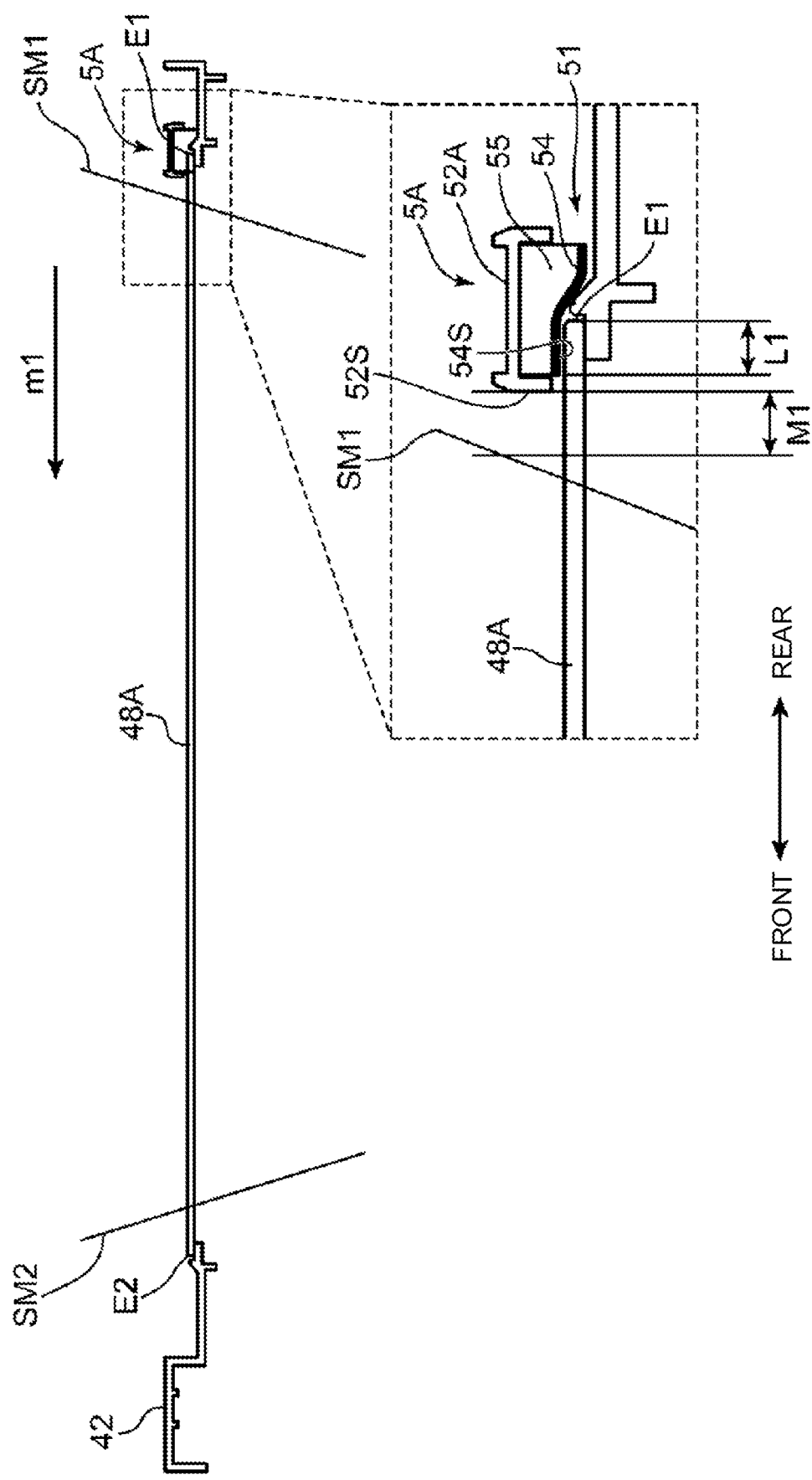
FIG. 11 illustrates the drive control of the cleaning unit of the second embodiment, and is a cross-sectional view showing the cleaning member positioned at the start position of the outward cleaning.

A second embodiment illustrates an embodiment in which the positional relation between the outermost angle ray of the scanning light S and the cleaning member 51 is taken into account. FIGS. 11 and 12 illustrate the drive control of the cleaning unit of the second embodiment. FIG. 11 is a cross-sectional view of the first cleaning unit 5A positioned at the start position of the outward cleaning m1, and FIG. 12 is a cross-sectional view of the second cleaning unit 5B positioned at the start position of the return cleaning m2.

FIGS. 11 and 12 describe a first outermost angle ray SM1 and a second outermost ray SM2 that indicate one end of the scanning width and the other end of the scanning width. The first outermost angle ray SM1 is a light ray when the scanning light S has a scanning angle leading to the scanning end at the first edge E1 side. The second outermost angle ray SM2 is a light ray when the scanning light S has a scanning angle leading to the scanning end at the second edge E2 side.

The first and second contact amounts L1 and L2 of the first and second cleaning units 5A and 5B have been previously described based on FIG. 10. In addition to this, FIGS. 11 and 12 illustrate a first distance M1 between the first outermost angle ray SM1 and the first holder 52A at the start position of the outward cleaning m1 and a second distance M2 between the second outermost angle ray SM2 and the second holder 52B at the start position of the return cleaning m2.

In detail, the first distance M1 is a distance in the front-to-rear direction between a front side surface 52S of the first holder 52A of the first cleaning unit 5A at the start position of the outward cleaning m1, and the first outermost angle ray SM1. When the first holder 52A is at a position that is closer than the first distance M1 from the start position of the outward cleaning m1, the first outermost angle ray SM1 hits the side surface 52S. The second distance M2 is a distance in the front-rear direction between a rear side surface 52S of the second holder 52B of the second cleaning unit 5B at the start position of the return cleaning m2, and the second outermost angle ray SM2. When the second holder 52B is at a position that is spaced apart backward by less than the second distance M2 from the start position of the return cleaning m2, the second outermost angle ray SM2 hits the side surface 52S. That is, if, during the interval of the cleaning, the first and second cleaning units 5A and 5B are not kept in standby with the first and second distances M1 and M2 secured for the first and second cleaning units 5A and 5B, a problem of blocking the scanning light S will occur.

In this embodiment, for the relation between the first and second contact amounts L1 and L2 and the first and second distances M1 and M2, L1=M1, L2=M2, L1≠L2 are set.

As described above, the first and second cleaning units 5A, 5B are coupled to the single drive wire 62 and are so interlocked that when the first cleaning unit 5A performs the outward cleaning m1, the second cleaning unit 5B performs the return cleaning m2. In such an interlocking mechanism, when L1 is set small, L2 becomes large. This results in a relation where M1 becomes large while M2 becomes small. Conversely, when L1 is set large, L2 becomes small. This results in a relation where M1 is small while M2 is large.

It is assumed that the drive system 60 may not be able to move the first and second holders 52A, 52B as designed, for example, due to the tolerance or assembly error. In this case, the first and second cleaning units 5A and 5B cannot be caused to stand by while the contact surfaces 54S have the set first and second contact amounts L1 and L2. However, with L1=M1 and L2=M2, even if the first and second holders 52A and 52B cannot be moved as designed, the error can be absorbed.

For example, assume that the first cleaning unit 5A stops at the start position of the outward cleaning m1 with the first contact amount L1 being smaller than the design value by ΔL. In this case, the first distance M1 is increased by ΔL. On the other hand, the second contact amount L2 of the second cleaning unit 5B increases by ΔL. Also, the second distance M2 decreases by ΔL. Therefore, even if a moving error should intervene, L1 and M1, and L2 and M2 can cancel the error within the margin of each other. That is, it is possible to form a state in which the first and second holders 52A, 52B never block the first and second outermost angle rays SM1, SM2, and the contact surface 54S of the cleaning member 51 held by each of them never moves to the outside of the first edge E1 or the second edge E2.

In addition to the above advantages, the operation of the drive system 60 can be stabilized by setting L1≠L2. Specifically, any gear skipping between the gear portion 631 of the drive transmission member 63 and the drive gear 71 for the motor 70 can be prevented. In this embodiment, the outward cleaning m1 and the return cleaning m2 are completed when the portion of each of the contact surfaces 54S of the first and second cleaning units 5A and 5B is in a contact state at the first and second contact amounts L1 and L2. However, the other portion of the contact surface 54S is away from the first or second edge E1, E2 of the first or second glasses 48A, 48B. In this case, the other portion will fall by the thickness of the first and second glasses 48A, 48B, causing an impact.

Specifically, in the outward cleaning m1 of the first cleaning unit 5A, the portion of the cleaning member 51 (contact surface 54S) held by the first holder 52A falls from the second edge E2 of the first glass 48A (first window), and the outward cleaning m1 ends when the first holder 52A contacts and is stopped by the stopper 42S. At the same time, in the second cleaning unit 5B for performing the return cleaning m2, the portion of the cleaning member 51 held by the second holder 52B falls from the first edge E1 of the second glass 48B (second window), and the second cleaning unit 5B also stops at the timing of the first holder 52A contacting and being stopped by the stopper 42S.

The impact of the cleaning member 51 at the time of falling from the first and second edges E1 and E2 or the collision of the cleaning member 51 with the stopper 42S may cause the gear skipping to the engagement portion between the gear portion 631 of the drive transmission member 63 and the drive gear 71. When the gear skipping occurs, the drive gear 71 may spin to thereby damage the gear blade of the gear portion 631. Here, if L1=L2, the timings at which the cleaning members 51 of the first and second cleaning units 5A and 5B fall from the first and second edges E1 and E2 coincide, causing a large impact. Such a large impact is a factor of the gear skipping.

However, in the present embodiment, since L1≠L2 creates a deviation in the fall timings, the generation of impact can be suppressed. That is, by setting L1≠L2, the deviation can be created between the timing at which the tip end in the moving direction of the cleaning member 51 of the first cleaning unit 5A falls from the second edge E2 of the first glass 48A and the timing at which the tip end in the moving direction of the cleaning member 51 of the second cleaning unit 5B falls from the first edge E1 of the second glass 48B. Therefore, the impact can be mitigated and the gear skipping can be prevented.

Figure 13A:
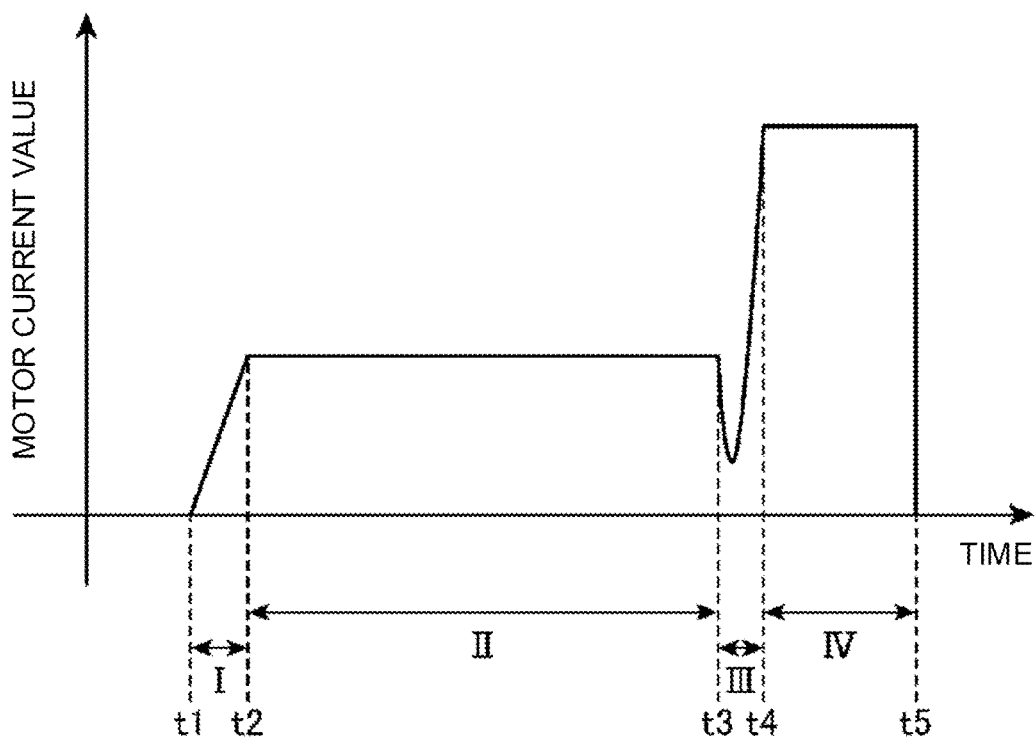
FIGS. 13A and B are graphs illustrating time variations in current values of motors for driving the cleaning units.

FIGS. 13A and B are graphs illustrating time variations in current values of the motors 70 for driving the first and second cleaning units 5A and 5B. In these graphs, time t1 is the timing at which driving of the first and second cleaning units 5A and 5B in the standby position is started for cleaning. Time t2 is a timing at which the contact surface 54S of the cleaning member 51 completely rides on the glass surface of the first or second glass 48A, 48B. That is, a period I from the time t1 to the time t2 is the period from the start of driving the first and second cleaning units 5A and 5B in the standby position until each contact surface 54S rides on the glass surface of the first or second glass 48A, 48B.

Time t3 is the timing at which the contact surface 54S begins to fall from the glass surface. That is, the timing at which the tip end in the moving direction of the cleaner member 54 exceeds the first and second edges E1 and E2. A period II from the time t2 to the time t3 is the period during which the contact surface 54S is cleaning the glass surface.

In the period I, the motor current gradually increases. This is due to the feature that each contact surface 54S, which is, at the beginning of the drive, in partial contact with the glass surface at the first and second contact amounts L1 and L2, gradually increases, due to the movement, the area in contact with the glass surface having a high frictional force, thereby increasing the load. On the other hand, in the period II, the motor current is stable because the first and second cleaning units 5A and 5B move under a constant frictional resistance.

Time t4 is the timing at which the first or second cleaning unit 5A, 5B contacts and is stopped by the stopper 42S. That is, a period III from the time t3 to the time t4 is the period during which the contact surface 54S begins to separate from the glass surface and impinges on the stopper 42S. In the period III, the motor current temporarily decreases due to the partial separation of the contact surface 54S from the glass surface which has a large frictional resistance, but the load increases due to the impinging on the stopper 42S, thus rapidly increasing the motor current. Time t5 is a timing at which the control unit 72 stops driving the motor 70 or starts a reverse rotation drive of the motor 70. The first or second cleaning unit 5A, 5B contacting and being stopped by the stopper 42S locks the motor 70 and stabilizes the motor current at a high value.

Figure 13B:
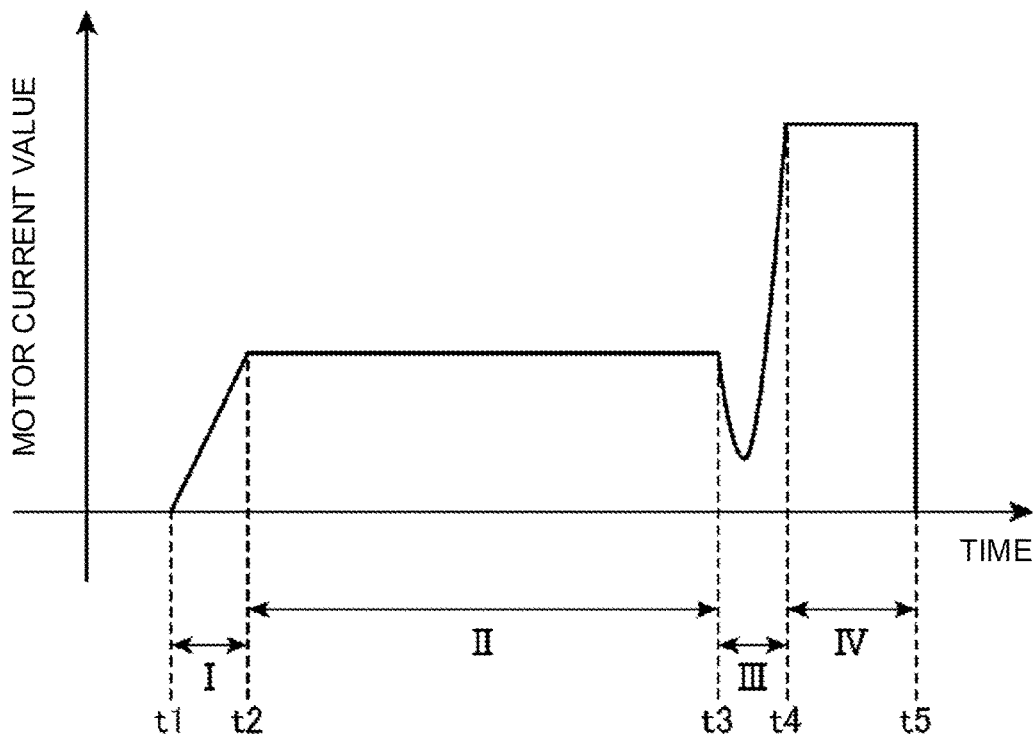

FIG. 13A illustrates the change in motor current when L1=L2, and FIG. 13B illustrates the change in motor current when L1≠L2. The slope of the motor current waveform in the period III is different between the two. In the case where L1=L2, the period III is shortened because the timing (t3) at which the cleaning member 51 falls from the glass surface to the timing (t4) at which the contact with the stopper 42S is achieved coincide between the first and second cleaning units 5A and 5B. Since the motor current changes as described above in this short period III, the slope of its current waveform becomes steep. In this case, the impact becomes large, and the gear skipping is likely to occur. In contrast, with L1≠L2, in the timing (t3) when the cleaning member 51 falls from the glass surface, there is a time lag between the first and second cleaning units 5A and 5B. Due to this, the period III becomes relatively long and the slope of its current waveform becomes slower than that in the case of L1=L2. Therefore, the impact is relatively small, and the occurrence of gear skipping can be suppressed.

Collection Mechanism for Removed Foreign Matter

Figure 14:
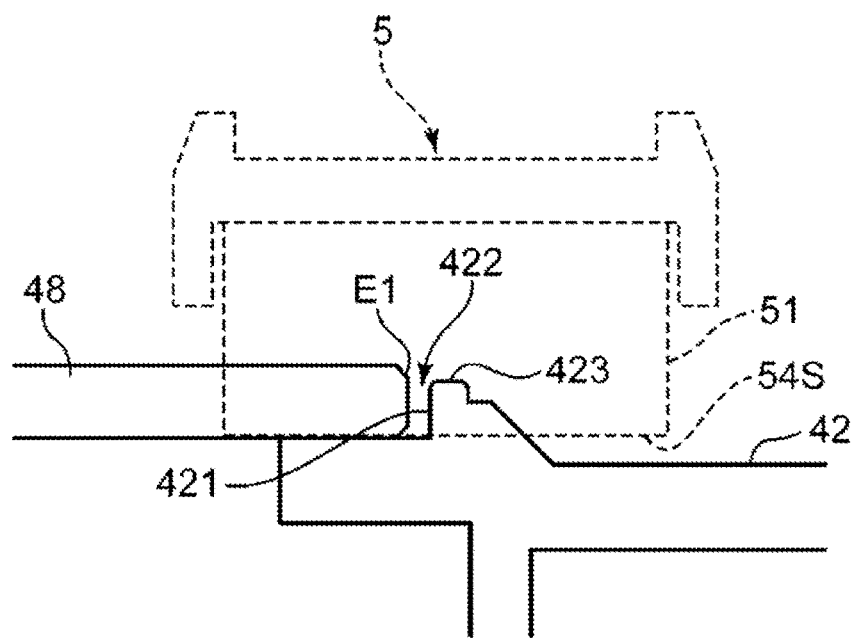
FIG. 14 is a cross-sectional view showing a collection mechanism for toner.

It is desirable that any foreign matter such as toner and dust having been wiped off from the dustproof glass 48 (first and second glasses 48A, 48B) by the cleaner member 54 of the cleaning member 51 should be collected by some method, instead of being left as it is. FIG. 14 is a cross-sectional view of an example of a collection mechanism for foreign matters. Here, an example is illustrated in which an opposing wall 421 (wall portion) facing the first edge E1 (second edge E2) of the dustproof glass 48 at a specific interval is provided. With this, a receiving space 422 is formed between the opposing wall 421 and the first edge E1. The opposing wall 421 is a side wall of a protruding portion 423 standing from the lid 42 in the outer vicinity of the first edge E1. The top surface of the protruding portion 423 is at a height position at which contact with the contact surface 54S of the cleaning member 51 is possible.

The cleaning member 51 passes above the receiving space 422 and slidably contacts the top surface of the protruding portion 423. With this, the foreign matter wiped off from the surface of the dustproof glass 48 by the cleaner member 54 can be collected in the receiving space 422. In addition, the protruding portion 423 can scrape off the foreign matter adhered to the contact surface 54S, and the contact surface 54S can be cleaned. The foreign matter scraped off by the protruding portion 423 is also collected in the receiving space 422.

Figure 15:
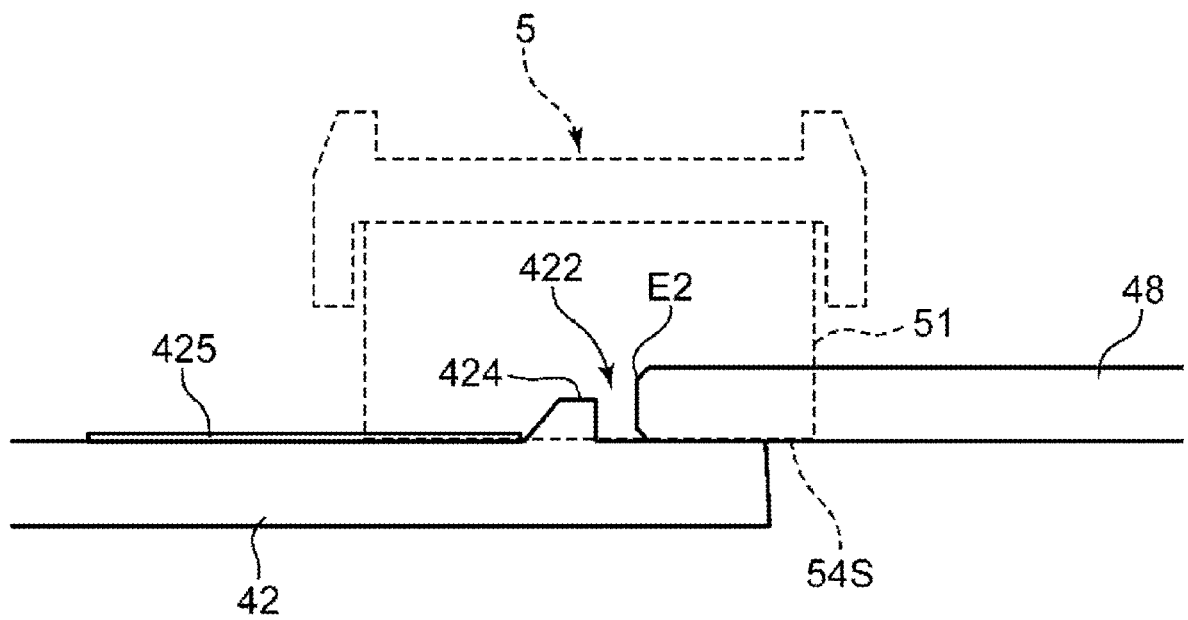
FIG. 15 is a cross-sectional view of a collection mechanism for toner.

FIG. 15 is a cross-sectional view of another example of the collection mechanism for foreign matters. Here, an example is illustrated in which a protruding portion 424 and a sheet-like stripping member 425 are disposed on the surface of the lid 42 at a position outside the second edge E2 of the dustproof glass 48. The protruding portion 424 is provided to protrude at a specific interval relative to the second edge E2, and the receiving space 422 for collecting any foreign matter is formed between the protruding portion 424 and the second edge E2. The stripping member 425 has a friction coefficient greater than that of the contact surface 54S, and is affixed at a position where the contact surface 54S can contact. According to this collection mechanism, causing the contact surface 54S to slidably contact the stripping member 425 can, based on the friction coefficient difference, strip off the foreign matter adhering to the contact surface 54S.

What is claimed is:

1. An optical scanning device, comprising:
   a housing that houses an optical system for generating an optical scanning light ray and includes a window portion for emitting the ray to outside;
   a cleaning system that is assembled to the housing and cleans the window portion; and
   a drive system that drives the cleaning system,
   wherein
   the window portion has a first edge at a first end side in a scanning direction and a second edge at a second end side in the scanning direction,
   the cleaning system includes:
   a cleaning unit that has:
   a cleaning member having a contact surface to contact a surface of the window portion, and
   a holder that holds the cleaning member,
   the drive system:
   moves the holder so as to perform an outward cleaning moving from the first edge toward the second edge and a return cleaning returning from the second edge to the first edge,
   at a start position of the outward cleaning, causes the holder to be stopped so that a portion of the contact surface of the cleaning member is positioned inside the first edge, and
   at a start position of the return cleaning, causes the holder to be stopped so that a portion of the contact surface of the cleaning member is positioned inside the second edge,
   wherein
   the drive system moves the holder so that a first contact amount L1 between the window portion and the contact surface at the start position of the outward cleaning and a second contact amount L2 between the window portion and the contact surface at the start position of the return cleaning have a relation of L1≠L2.

2. The optical scanning device according to claim 1, wherein
   when the start position of the outward cleaning is set to a standby position of the cleaning unit in a period when the cleaning system does not clean the window portion, the drive system moves the holder so as to satisfy a relation of L1<L2.

3. The optical scanning device according to claim 1, wherein
   the window portion includes a first window portion and a second window portion which are disposed at different positions of the housing,
   the cleaning system includes a first cleaning unit for cleaning the first window portion and a second cleaning unit for cleaning the second window portion, and the first cleaning unit and the second cleaning unit are interlocked so that,
   when the first cleaning unit performs the outward cleaning from the first edge toward the second edge of the first window portion, the second cleaning unit performs the return cleaning from the second edge toward the first edge of the second window portion, and
   when the first cleaning unit performs the return cleaning from the second edge toward the first edge of the first window portion, the second cleaning unit performs the outward cleaning from the first edge toward second edge of the second window portion,
   the housing includes a stopper which the first cleaning unit contacts and by which the first cleaning unit is stopped at an end position of the outward cleaning,
   the drive system includes:
   an interlocking member that interlocks a first holder of the first cleaning unit with a second holder of the second cleaning unit,
   a drive transmission member that includes a gear portion and transmits a drive force to the interlocking member, and
   a drive gear that is given the drive force from a drive source and that meshes with the gear portion of the drive transmission member.

4. The optical scanning device according to claim 1, wherein
   the window portion includes a first window portion and a second window portion disposed at different positions of the housing,
   the cleaning system includes a first cleaning unit for cleaning the first window portion and a second cleaning unit for cleaning the second window portion, and the first cleaning unit and the second cleaning unit are interlocked so that,
   when the first cleaning unit performs the outward cleaning from the first edge toward the second edge of the first window portion, the second cleaning unit performs the return cleaning from the second edge toward the first edge of the second window portion, and when the first cleaning unit performs the return cleaning from the second edge toward the first edge of the first window portion, the second cleaning unit performs the outward cleaning from the first edge toward second edge of the second window portion, the drive system includes an interlocking member that interlocks a first holder of the first cleaning unit with a second holder of the second cleaning unit, and when the optical scanning light ray in a state of having a scanning angle that leads to a scanning end on the first edge side is defined as a first outermost angle ray, and the optical scanning light ray in a state of having a scanning angle that leads to a scanning end on the second edge side is defined as a second outermost angle ray, and a distance between the first outermost angle ray and the first holder at the start position of the outward cleaning is defined as M1, and a distance between the second outermost angle ray and the second holder at the start position of the return cleaning is defined as M2, relations of L1=M1 and L2=M2 are satisfied.

5. The optical scanning device according to claim 1, wherein the housing has a wall portion that faces each of the first edge and the second edge of the window portion at a specific receiving space.

6. An image forming device, comprising:
an image carrier; and
the optical scanning device according to claim 1, wherein the optical scanning device irradiates a scanning light ray to the image carrier based on image information.

7. An optical scanning device, comprising:
a housing that houses an optical system for generating an optical scanning light ray and includes a window portion for emitting the ray to outside;
a cleaning system that is assembled to the housing and cleans the window portion; and
a drive system that drives the cleaning system, wherein
the window portion has a first edge at a first end side in a scanning direction and a second edge at a second end side in the scanning direction,
the cleaning system includes:
a cleaning unit that has:
a cleaning member having a contact surface to contact a surface of the window portion, and
a holder that holds the cleaning member,
the drive system:
moves the holder so as to perform an outward cleaning moving from the first edge toward the second edge and a return cleaning returning from the second edge to the first edge,
at a start position of the outward cleaning, causes the holder to be stopped so that a portion of the contact surface of the cleaning member is positioned inside the first edge, and
at a start position of the return cleaning, causes the holder to be stopped so that a portion of the contact surface of the cleaning member is positioned inside the second edge,
wherein the housing includes a protruding portion disposed outside each of the first edge and the second edge of the window portion and is capable of contacting the contact surface.

8. An optical scanning device, comprising:
a housing that houses an optical system for generating an optical scanning light ray and includes a window portion for emitting the ray to outside;
a cleaning system that is assembled to the housing and cleans the window portion; and
a drive system that drives the cleaning system, wherein
the window portion has a first edge at a first end side in a scanning direction and a second edge at a second end side in the scanning direction,
the cleaning system includes:
a cleaning unit that has:
a cleaning member having a contact surface to contact a surface of the window portion, and
a holder that holds the cleaning member,
the drive system:
moves the holder so as to perform an outward cleaning moving from the first edge toward the second edge and a return cleaning returning from the second edge to the first edge,
at a start position of the outward cleaning, causes the holder to be stopped so that a portion of the contact surface of the cleaning member is positioned inside the first edge, and
at a start position of the return cleaning, causes the holder to be stopped so that a portion of the contact surface of the cleaning member is positioned inside the second edge,
wherein the housing includes a stripping member which is disposed outside each of the first edge at the start position of the outward cleaning and the second edge at the start position of the return cleaning, which has a friction coefficient greater than a friction coefficient of the contact surface, and which the contact surface can contact.

* * * * *